United States Patent
Iwashiro

(10) Patent No.: US 7,158,334 B2
(45) Date of Patent: Jan. 2, 2007

(54) METHOD AND APPARATUS FOR HEAD POSITIONING CONTROL WITH DISTURBANCE COMPENSATION IN A DISK DRIVE

(75) Inventor: Masafumi Iwashiro, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/088,855

(22) Filed: Mar. 25, 2005

(65) Prior Publication Data

US 2005/0243458 A1 Nov. 3, 2005

(30) Foreign Application Priority Data

Apr. 28, 2004 (JP) .............................. 2004-134500

(51) Int. Cl.
*G11B 5/596* (2006.01)
(52) U.S. Cl. .................. 360/77.02; 360/78.04; 360/78.07
(58) Field of Classification Search ...................... None
See application file for complete search history.

(56) References Cited

U.S. PATENT DOCUMENTS

| | | | |
|---|---|---|---|
| 5,663,847 A | 9/1997 | Abramovitch | |
| 6,417,983 B1 * | 7/2002 | Yatsu | 360/77.04 |
| 6,496,320 B1 | 12/2002 | Liu | |
| 6,549,349 B1 | 4/2003 | Sri-Jayantha et al. | |
| 6,614,615 B1 * | 9/2003 | Ju et al. | 360/78.04 |
| 6,618,219 B1 | 9/2003 | Ho | |
| 6,628,472 B1 | 9/2003 | Ho | |
| 6,667,845 B1 | 12/2003 | Szita | |
| 6,711,598 B1 * | 3/2004 | Pare et al. | 708/300 |
| 6,721,122 B1 | 4/2004 | Aikawa et al. | |
| 6,940,680 B1 * | 9/2005 | Iwashiro | 360/77.07 |
| 2003/0193736 A1 | 10/2003 | Min et al. | |

FOREIGN PATENT DOCUMENTS

| | | |
|---|---|---|
| EP | 0 264 535 | 4/1988 |
| WO | WO 00/42603 | 7/2000 |

OTHER PUBLICATIONS

Australian Search Report dated Feb. 1, 2006 for Appln. No. 200502198-5.

* cited by examiner

*Primary Examiner*—K. Wong
(74) *Attorney, Agent, or Firm*—Pillsbury Winthrop Shaw Pittman, LLP

(57) ABSTRACT

A head positioning control system which is applied to a disk drive is disclosed. The system includes a feedback control system which performs head positioning control of a head and a feedforward control system. The feedforward control system detects the amplitude and phase of a disturbance based on the position error between the position of the head and a target position. The feedforward control system computes a disturbance compensation value for eliminating the disturbance to output the disturbance compensation value to the feedback control system based on each detection result of the amplitude and the phase.

11 Claims, 9 Drawing Sheets

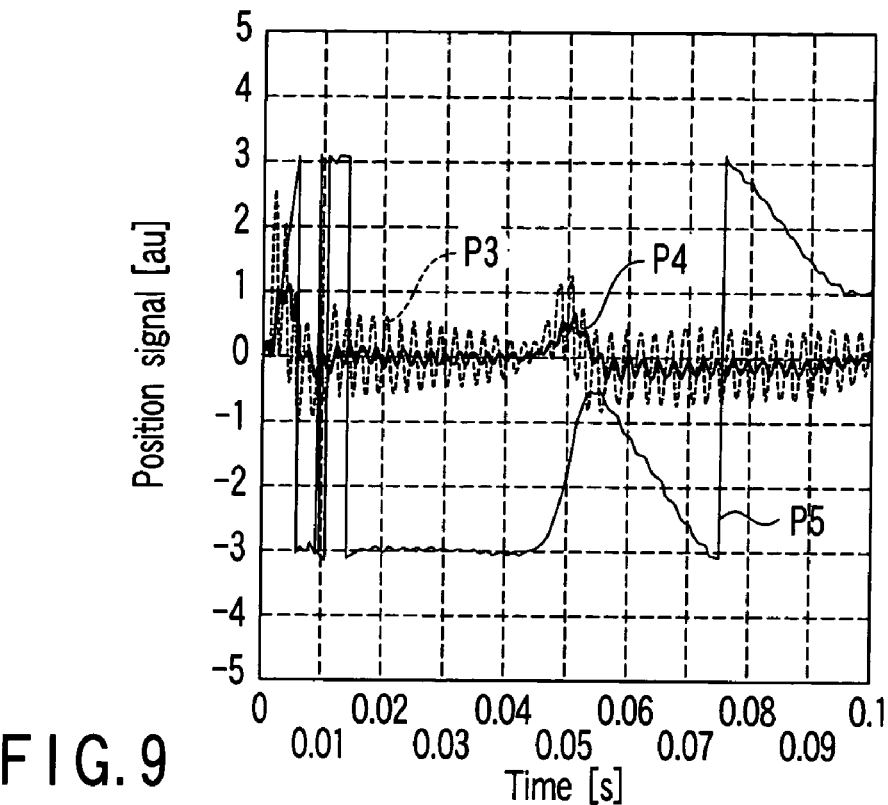
F I G. 9
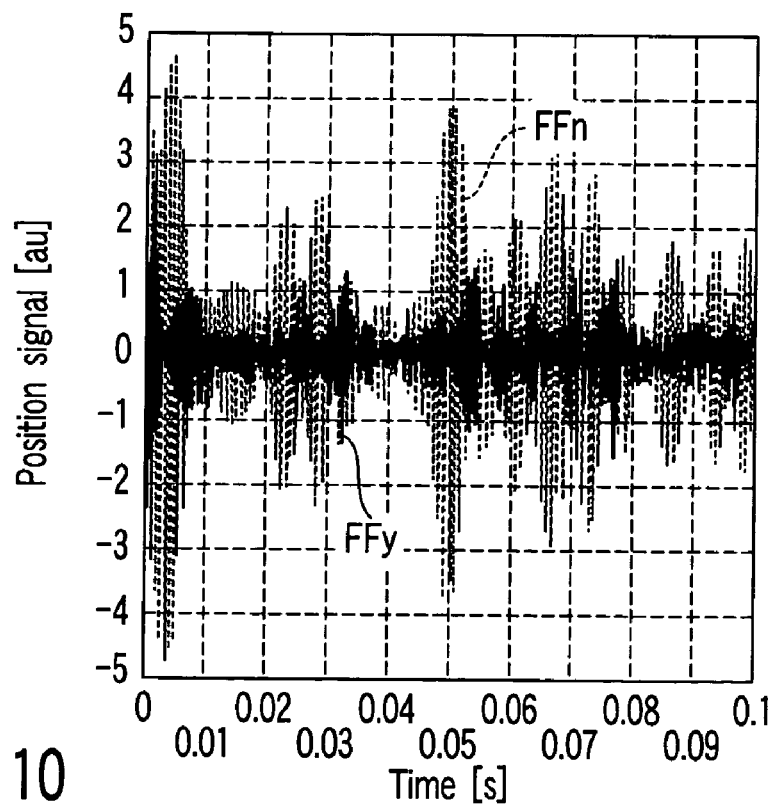
F I G. 10

METHOD AND APPARATUS FOR HEAD POSITIONING CONTROL WITH DISTURBANCE COMPENSATION IN A DISK DRIVE

CROSS-REFERENCE TO RELATED APPLICATIONS

This application is based upon and claims the benefit of priority from prior Japanese Patent Application No. 2004-134500, filed Apr. 28, 2004, the entire contents of which are incorporated herein by reference.

BACKGROUND OF THE INVENTION

1. Field of the Invention

The present invention relates to a disk drive, and particularly to head positioning control technology with disturbance compensation.

2. Description of the Related Art

Generally a head positioning control system for positioning a head at a target position (target track) on a disk medium is incorporated into a disk drive typically including a hard disk drive.

In the case of a disturbance having a large influence, such as a vibration and an impact, head positioning accuracy is decreased in the head positioning control system. Therefore, a disturbance compensation function of suppressing the disturbance which affects the head positioning accuracy is important in the head positioning control system of the disk drive.

With reference to the head positioning control system with the disturbance compensation function, there is proposed a system which uses a feedforward control system for suppressing the influence of disturbance by an adaptive filtering method (for example, see U.S. Pat. No. 5,663,847).

An acceleration sensor for observing (detecting) the disturbance is required in a head positioning control system in the prior art, in which the feedforward control system is used. Accordingly, when the head positioning control system of the prior art is applied to the disk drive, there are problems that the number of components is increased and the system structure becomes complicated in order to implement the system.

BRIEF SUMMARY OF THE INVENTION

In accordance with an aspect of the present invention, there is provided a disk drive including a facility of a head positioning control which can effectively suppress disturbance without using an acceleration sensor and the like.

The disk drive comprises an actuator to position a head at a target position on a disk medium; a first controller which controls the actuator by feedback control to position the head at the target position on the disk medium based on position error information between the target position and a position of the head; and a second controller which outputs a disturbance compensation value to the first controller, wherein the second controller includes an amplitude detection unit which inputs the position error information to detect an amplitude of narrow-band disturbance from the position error information; a phase detection unit which detects a phase of the narrow-band disturbance from the position error information; and a unit which computes the disturbance compensation value for eliminating the narrow-band disturbance based on each detection result of the amplitude detection unit and the phase detection unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 8 and 9 are views for explaining operation of a phase detection unit in the feedforward control system;

FIG. 10 is a view showing a time change in head position error according to the first embodiment;

DETAILED DESCRIPTION OF THE INVENTION

Referring now to the accompanying drawing, embodiments of the invention will be described below.

(First Embodiment)

Figure 1:
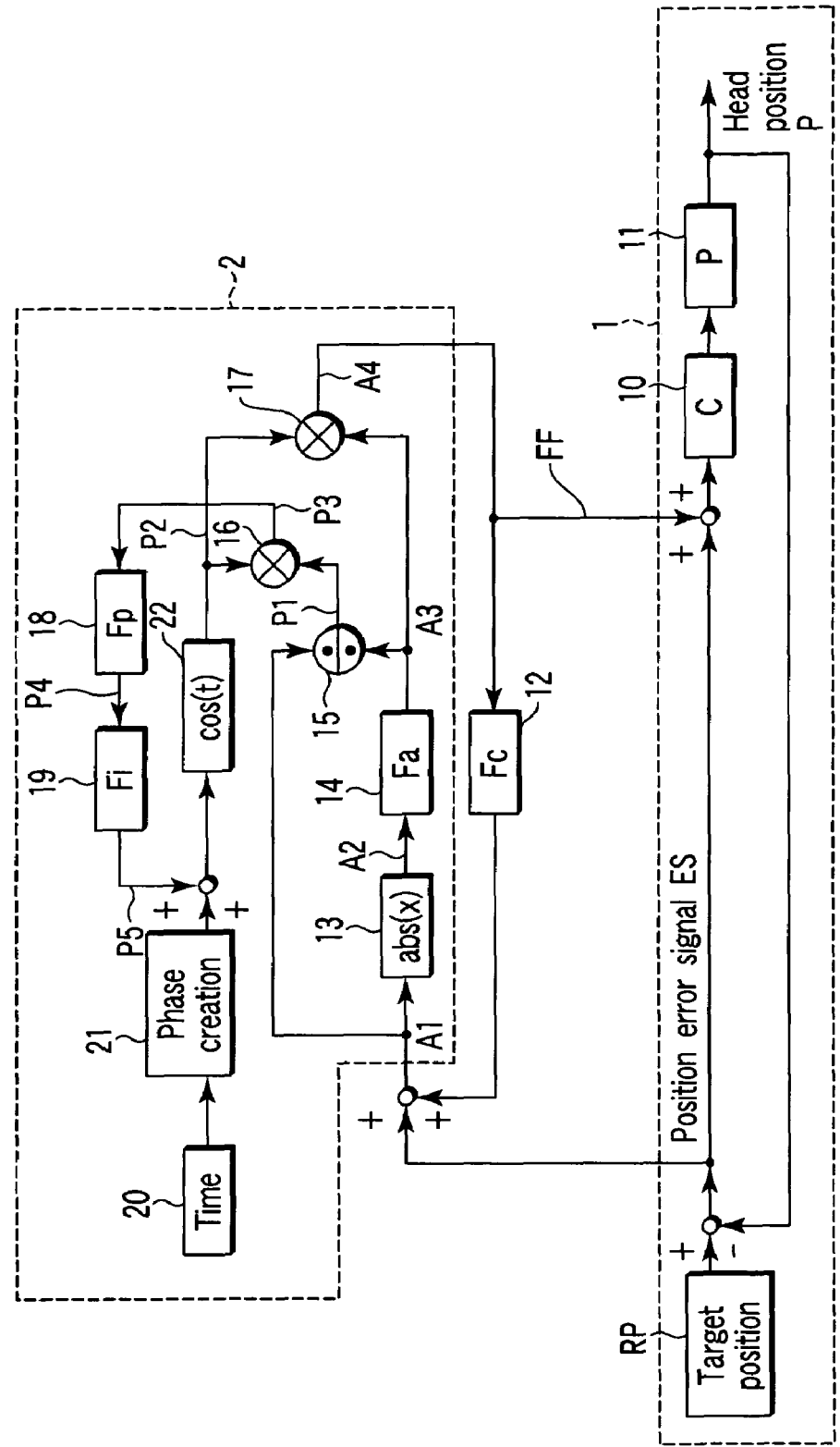
FIG. 1 is a block diagram showing a configuration of a head positioning control system according to a first embodiment of the invention.
Figure 2:
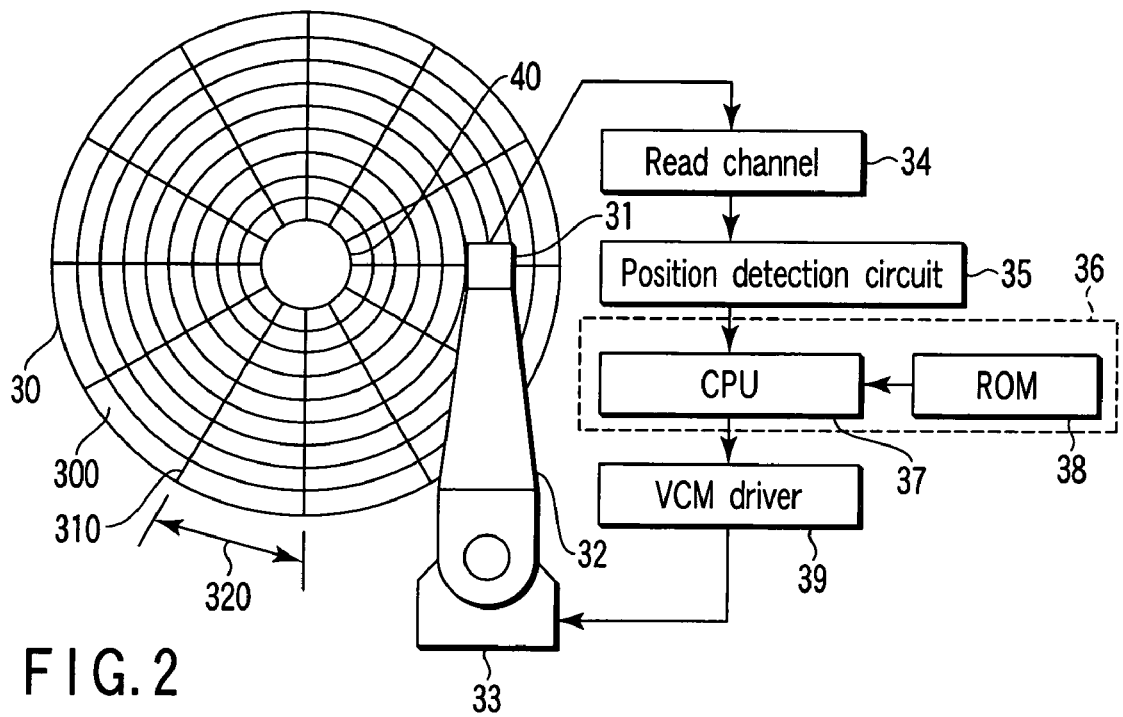
FIG. 2 is a block diagram showing a main part of a disk drive according to the first embodiment.

FIG. 1 is a block diagram showing a configuration of a head positioning control system according to a first embodiment of the invention. FIG. 2 is a block diagram showing a main part of a disk drive according to the first embodiment.

(Configuration of Disk Drive)

As shown in FIG. 2, the disk drive of the first embodiment is a hard disk drive. The disk drive includes a disk medium 30, a head 31, and a head positioning control system (servo system).

The disk medium 30 is rotated by a spindle motor 40. Many concentric tracks 300 which are of a data recording area are formed on the disk medium 30. Servo sectors are arranged in each track 300. Each servo sector includes a servo area 310 in which servo data (position information) is recorded and a data sector 320 serving as an area in which user data is recorded.

The head 31 is mounted on an actuator 32 which is rotated by a voice coil motor (VCM) 33. The actuator 32 positions the head 31 at a target position on the disk medium 30 under control of the head positioning control system.

The head 31 includes a read head which reads the servo data (position information) and the user data from the disk medium 30 and a write head which writes the user data. At this point, because the disk medium 30 is rotated at constant angular velocity, the read head reads the servo data from the servo area 310 at constant time intervals.

The head positioning control system includes a read channel 34, a position detection circuit 35, a controller 36, and a VCM driver 39.

The read channel 34 is a circuit which performs signal processing for demodulating a read signal read by the read head in the head 31. The position detection circuit 35 includes a circuit which separates the user data and the servo data from the read signal process by the read channel 34. The position detection circuit 35 detects the position of the head 31 on the disk medium 30 according to the servo data.

The controller 36 includes a microprocessor (CPU) 37 which is of a main element of the head positioning control system, and a ROM 38. The CPU 37 performs a head positioning control process of the first embodiment to compute an actuating control value (hereinafter simply referred to as control value) for driving and controlling the VCM 33. The CPU 37 computes the control value based on the head position (P) detected at predetermined intervals, a program and control parameters which are stored in the ROM 38, a program process time measured by a timer, and the like.

The VCM driver 39 is a drive circuit which supplies drive current to the VCM 33 according to the control value computed by the CPU 37 to drive and control the VCM 33.

(Head Positioning Control System)

As shown in FIG. 1, the head positioning control system of the first embodiment is mainly formed by a feedback (FB) control system 1 and a feedforward (FF) control system 2. Actually, the head positioning control system is realized by the controller 36 including the CPU 37. The controller 36 can be separated into a first controller which realizes the FB control system 1 and a second controller which realizes the FF control system 2.

In the disk drive, as described above, the disk medium 30 is rotated at constant angular velocity. Accordingly, the current head position P is obtained from the servo area 310 which is at the front end of each servo sector in synchronization with the angle of rotation of the disk medium 30.

The FB control system 1 constitutes a sampled data control system which determines an input value (control value) input to a plant 11 at constant time interval. The plant 11 is a control object. Due to mechanical and electrical restrictions, there is a limitation to the control value output from the first controller 10 to the VCM driver 39. The FB control system 1 is broadly divided into the first controller (transfer function C) 10, the plant (transfer function P) 11, and a position detection unit which detects a position error signal ES. The first controller 10 corresponds to a linear filter which determines the control value (corresponding to a drive current value of the VCM 33) of the plant 11 from the position error signal ES.

The plant 11 means the VCM driver 39 in the narrow sense, and the plant 11 means the actuator 32 on which the head 31 is mounted in the broad sense. The actuator 32 moves the head 31 in a radial direction of the disk medium 30 by the drive of the VCM 33. The VCM driver 39 supplies to the VCM 33 the drive current according to the control value outputted from the first controller 10 to drive and control the actuator 32.

The position error signal ES indicates an error between a position HP of the head 31 moved by the actuator 32 and a target position RP specified as an access object on the disk medium 30.

Further, the head positioning control system has the FF control system 2 and an intermediate closed-loop transfer characteristics filter (transfer characteristics Fc) 12. The closed-loop transfer characteristics filter 12 is a transfer function filter of the FB control system 1. Accordingly, Fc is expressed by $Fc=CP/(1+CP)$, where C is the transfer function of the controller 10, and P is the transfer function of the plant 11.

The FF control system (second controller) 2 includes an amplitude detection unit which detects the amplitude of the disturbance from the position error signal ES and a phase detection unit which detects the phase of the disturbance. The amplitude detection unit has an absolute-value computing unit 13 and a lowpass filter (LPF [transfer function Fa]) 14.

The phase detection unit has an LPF (transfer function Fp) 18, a filter (transfer function Fi) 19 which determines phase correction feedback characteristics having an integral element, and an oscillation unit. The oscillation unit includes a time generation unit 20, a phase generation unit 21, and a cosine-wave oscillation unit 22.

Figure 3:
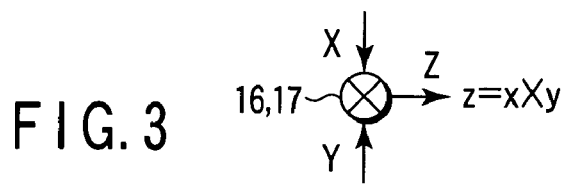
FIG. 3 is a view for explaining a multiplying unit in a feedforward control system according to the first embodiment.
Figure 4:
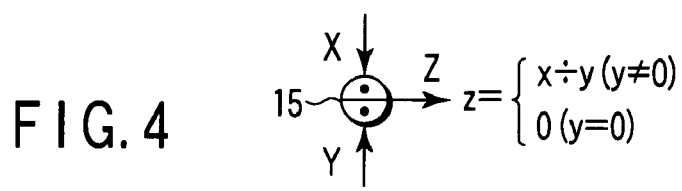
FIG. 4 is a view for explaining a dividing unit in the feedforward control system.

In the FF control system 2, as shown in FIG. 3, specifically multiplying units 16 and 17 shown in FIG. 1 are one which performs two-input multiplication. A dividing unit 15 is one which performs division as shown in FIG. 4.

(Operation of Head Positioning Control System)

Referring to FIGS. 1 and 5 to 13, operation of the head positioning control system of the first embodiment will be described.

In the FB control system 1, the first controller 10 inputs the position error signal ES of the head 31 to compute the control value for positioning the head 31 at the target position RP. The position error signal ES indicates the error between the target position RP and the position P of the head 31 which is obtained from the servo area of the disk medium 1. The position detection circuit 35 detects the position P of the head 31 based on the servo data. The servo data includes a cylinder code for indicating the track position on the disk medium 30 and burst data for indicating the position within one track.

Figure 6:
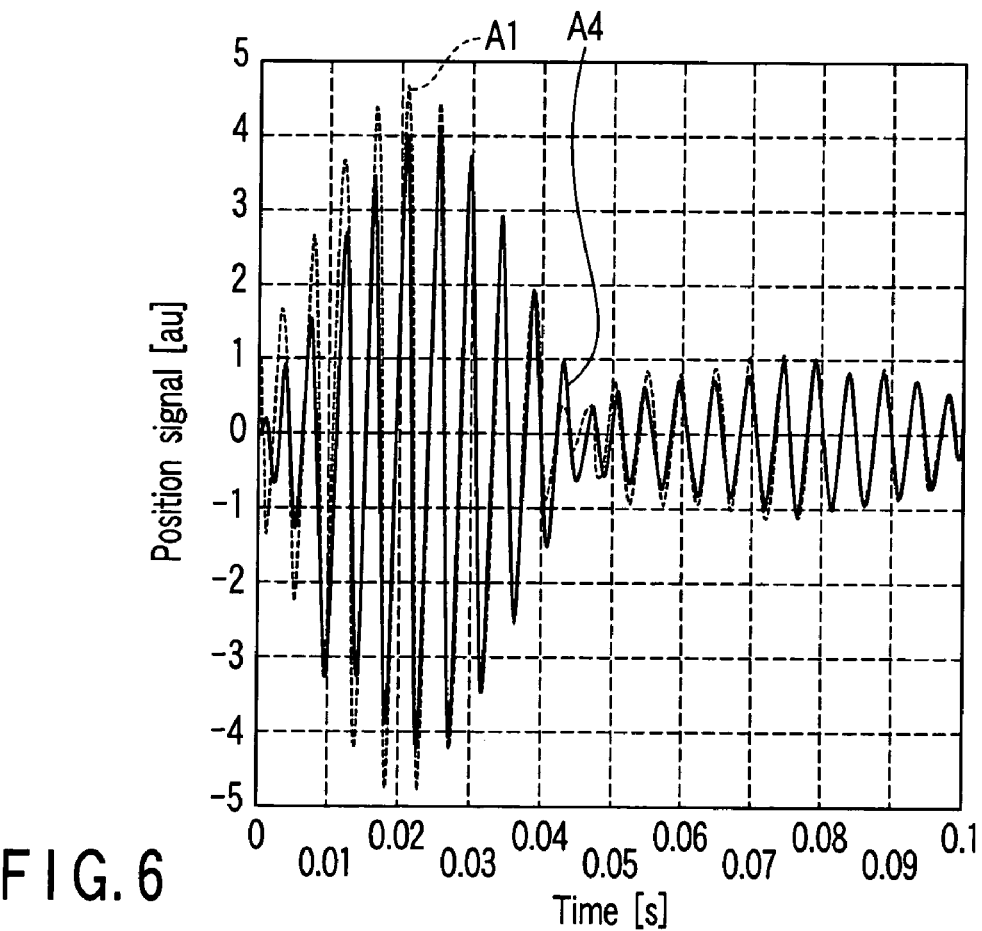
FIG. 6 is a view showing a time change in input and output signals of the feedforward control system.

The FF control system (second controller) 2 inputs the position error signal ES (input signal A1) to detect the changes in amplitude and phase of the disturbance, and the FF control system 2 generates a control compensation value FF (output signal A4) to output the control compensation value FF to the FB control system 1. FIG. 6 shows time changes in input signal A1 and output signal A4, in which the time changes follow input amplitude fluctuation. The control compensation value FF means a disturbance compensation value given to the FB control system 1.

Figure 7:
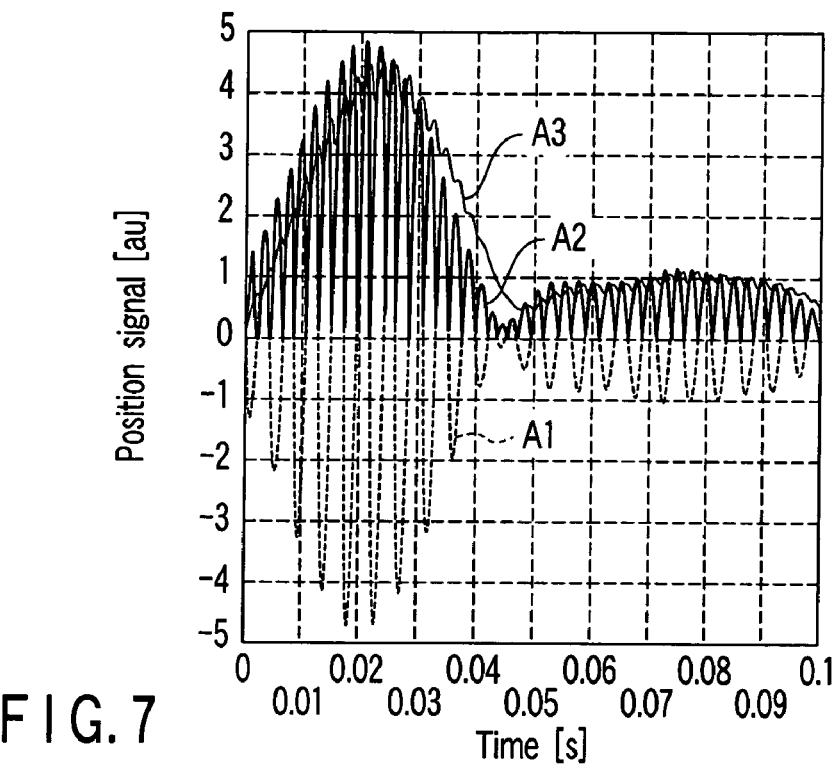
FIG. 7 is a view showing characteristics of an internal signal of the feedforward control system.

In the amplitude detection unit, the absolute-value computing unit 13 computes an absolute value (A2) of the input signal A1. The LPF 14 determines the disturbance amplitude (A3) from the absolute value signal (A2). FIG. 7 shows the time changes in input signal A1, absolute value signal A2, and output signal (amplitude) A3 of the LPF 14. The absolute value signal A2 includes a time change component of the amplitude in a low-frequency and a double-frequency component of the disturbance frequency. Only the time change component A3 of the disturbance amplitude is extracted by the LPF 14. The direct-current gain of the LPF 14 has a value which is multiplied by a square root of 2.

In the phase detection unit, at a pre-stage of determining the phase, the dividing unit 15 divides the input signal A1 by the amplitude A3 to compute a phase signal P1 in which the amplitude becomes constant. At this point, when the amplitude is zero, the phase signal P1 becomes infinity. Therefore, as shown in FIG. 4, when the amplitude (y) is zero, the phase signal (z) P1 is also set to zero.

The phase detection unit detects the phase difference between the phase signal P1 of the input signal A1 and the phase signal P2 generated by the oscillation unit, and the phase detection unit uses a phase correction feedback loop which corrects the phase of the phase signal P2.

Figure 8:
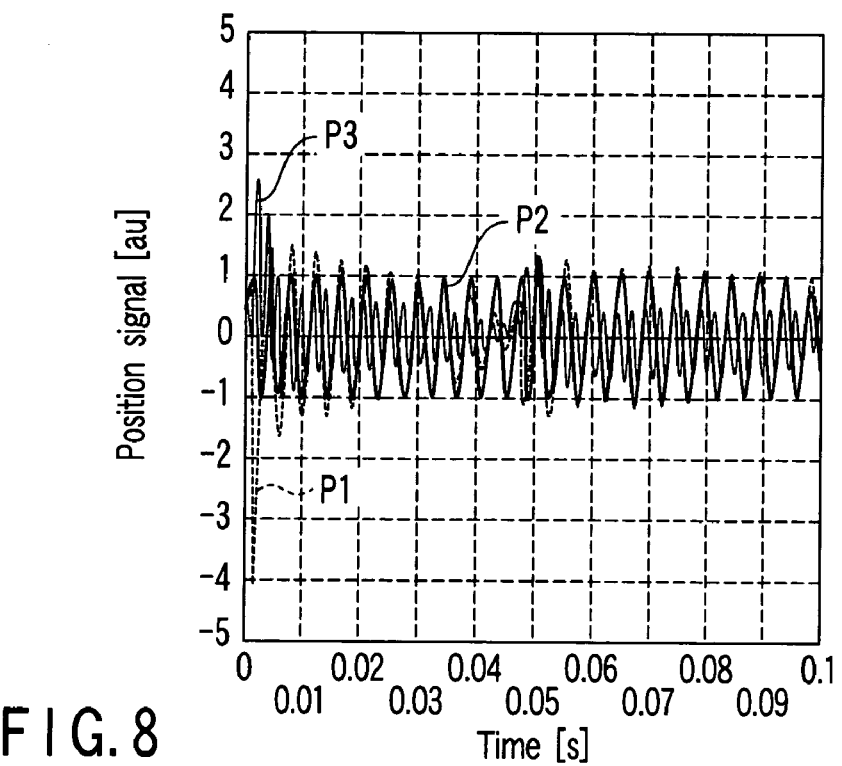

The oscillation unit previously estimates a band in which the disturbance exists, and the oscillation unit creates the phase signal P2 so as to generate a center frequency of the band. The phase difference is detected by utilizing the following equation (1):

$$\cos(ft+A) \times \cos(ft+B) = \frac{1}{2}(\cos(2ft+A+B)+\cos(A-B)), \quad \text{Equation (1)}$$

where f is the frequency, t is time, and A and B are the phase of a cosine wave. Since the first term on the right side expresses a double component of the frequency f, and the second term expresses a phase difference component, the first term is eliminated by the LPF 18 to utilize only the second term component for the phase correction. As shown in FIG. 8, the product P3 of P1 and P2 (output of the multiplying unit 16) includes the double-frequency component of P1 and P2 and a time change component of the phase difference.

The LPF 18 is a lowpass filter in which the gain is sufficiently low at the double-frequency and the direct-current gain becomes unity. As shown in FIG. 9, the LPF 18 extracts a phase difference component P4 from the output P3 of the multiplying unit 16. The filter 19 is one which determines phase correction feedback characteristics having a multiplication element. The filter 19 outputs a phase correction signal P5 as shown in FIG. 9.

In the FF control system 2, the multiplying unit 17 computes the product of the amplitude signal A3 from the amplitude detection unit and the phase signal P2 from the phase detection unit, and the computed result is output as an FF signal (disturbance compensation signal) A4.

Figure 5:
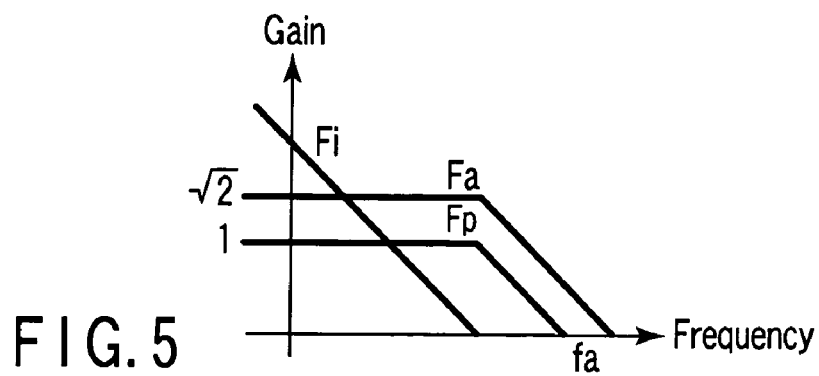
FIG. 5 is a view showing filter transfer characteristics in the feedforward control system.

FIG. 5 is a view showing transfer characteristics of each of the filters 14, 18, and 19 in the amplitude detection unit and the phase detection unit. In FIG. 5, frequency fa represents the double frequency of the disturbance.

While the FF signal A4 output from the FF control system 2 is added to the position error signal ES through the closed-loop transfer characteristics filter 12 while output to the FB control system 1. The added signal becomes the input signal A1 of the FF control system 2. The closed-loop transfer characteristics filter 12 is one which has the transfer characteristics of the FB control system 1. The closed-loop transfer characteristics filter 12 is the element for returning the value of the disturbance eliminated by the disturbance compensation value FF.

As described above, according to the head positioning control system of the first embodiment, the disturbance can be compensated for improve the head positioning accuracy. In this case, the system of the first embodiment realizes the configuration in which the disturbance is observed by the detection units for detecting the amplitude and the phase of the disturbance from the position error signal ES without using the acceleration sensor and the like. Then, the effect of the first embodiment will specifically be described.

Figure 11:
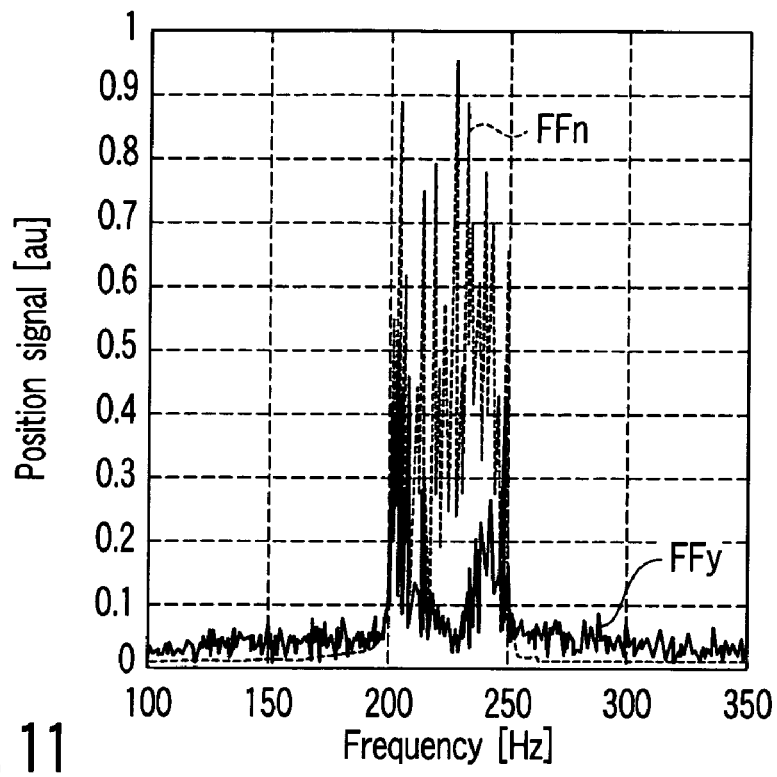
FIG. 11 is a view showing frequency characteristics of the head position error according to the first embodiment.

FIG. 10 shows a time change in head position error when narrow-band disturbance is applied. FIG. 11 shows frequency characteristics of the head position error when the narrow-band disturbance is applied. In both cases, comparisons are made by the presence or absence of the feedforward (FF) control. When compared with the case where the FF control does not exist (FFn), in the case where the FF control of the first embodiment exists (FFy), it is found that the position error accuracy is improved.

Figure 12:
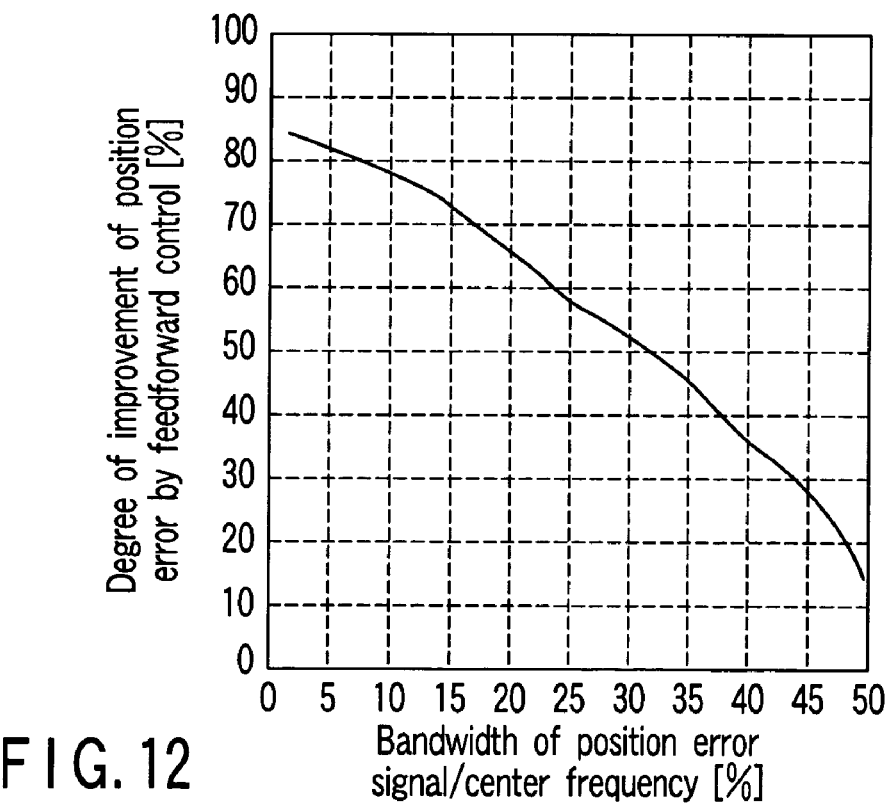
FIG. 12 is a view showing a degree of improvement of a position error by the feedforward control system.
Figure 13:
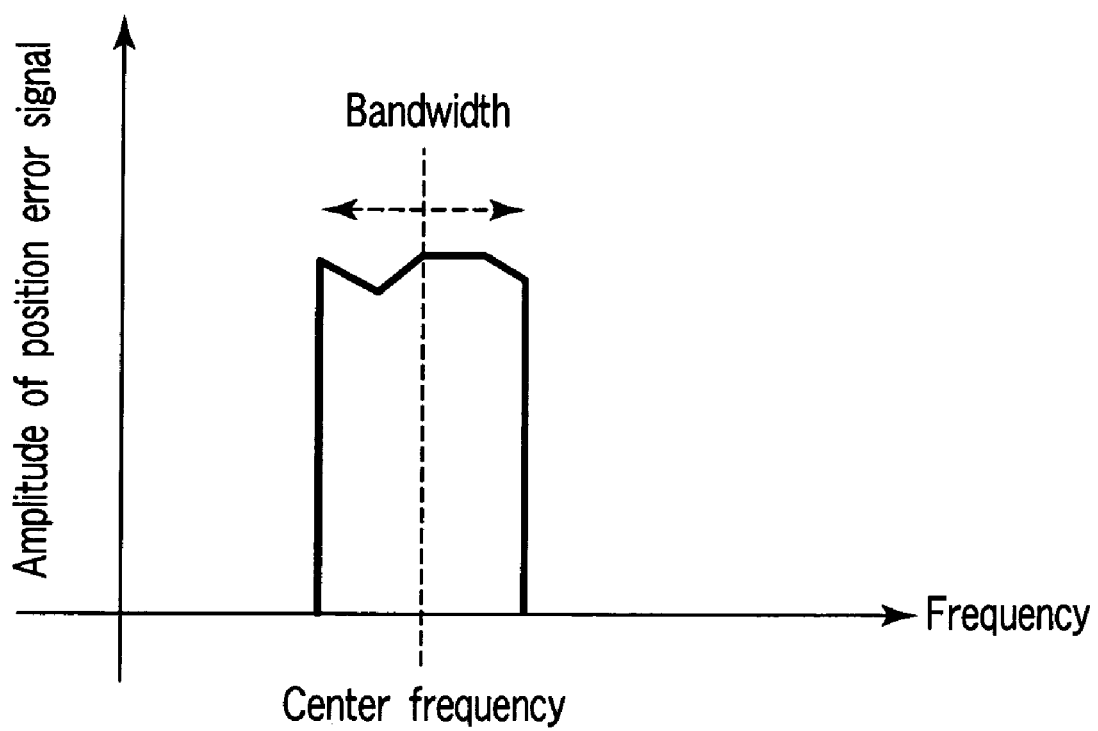
FIG. 13 is a view for explaining definitions of a center frequency and a band width of disturbance in the first embodiment.

FIG. 12 shows the comparisons in the bandwidth and a degree of improvement of the position error. In the first embodiment, because the FF input follows the position error signal which fluctuates in the constant frequency range, the degree of improvement of the position error is degraded when the bandwidth is broadened. In FIG. 13, the bandwidth and the center frequency of the disturbance band are defined. In FIG. 13, the ratio of the bandwidth to the center frequency is set to the X axis of FIG. 12, and the ratio of the positioning accuracy when the FF control is not performed to the positioning accuracy when the FF control is performed is set to the Y axis of FIG. 12.

As can be seen from FIG. 12, the degree of improvement is degraded when the bandwidth is increased. For example, in order to make the narrow-band disturbance one half, it is preferable that the bandwidth is set to about 30% of the center frequency. However, the degree of improvement of the position error are also affected by transient characteristics of the disturbance, the sampling frequency of the head positioning accuracy system, the frequency characteristics of the feedback controller 10, the lowpass filter characteristics of the amplitude phase detection function unit in the FF control system 2, and the like.

(Second Embodiment)

Figure 14:
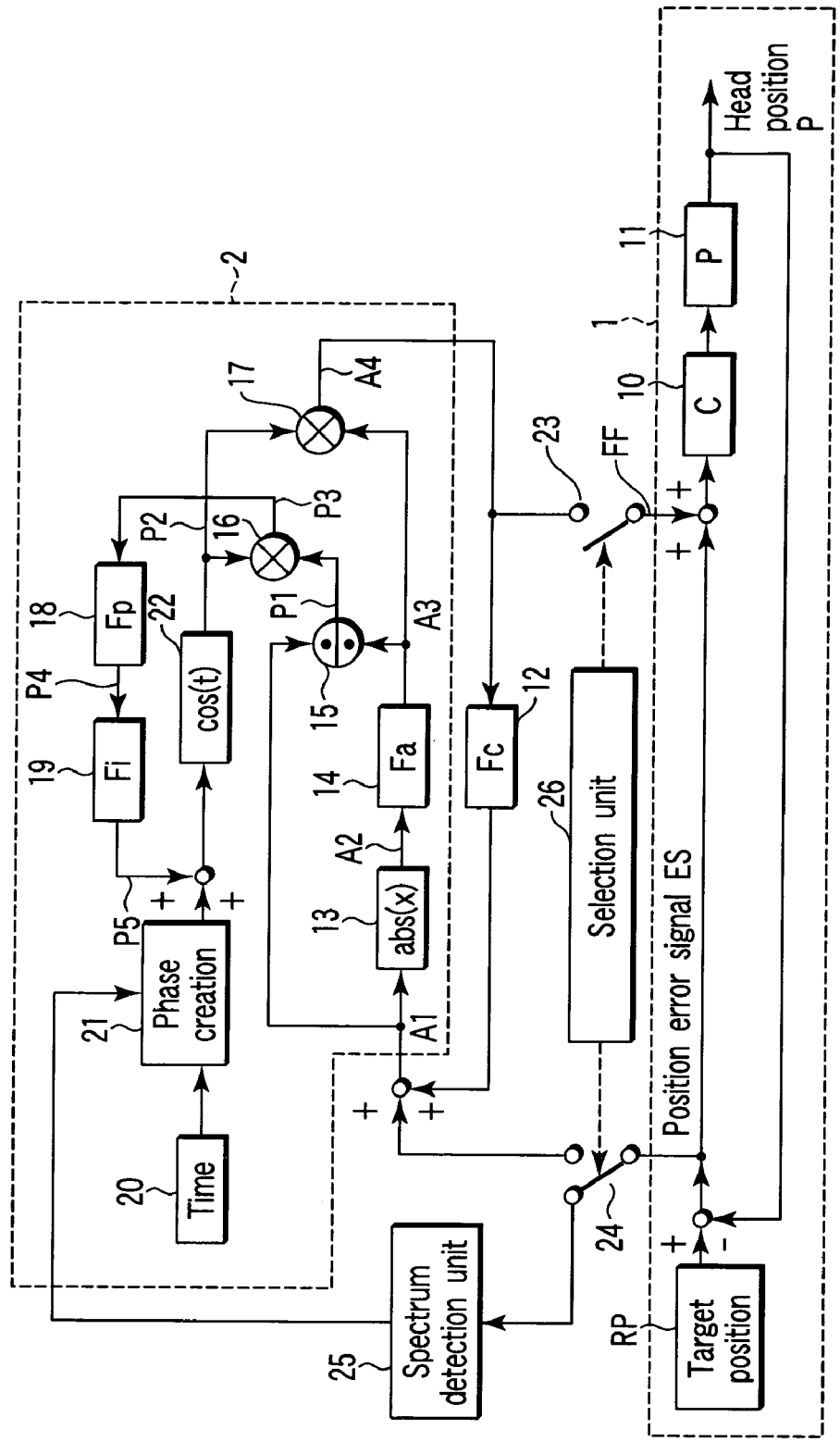
FIG. 14 is a block diagram showing a configuration of a head positioning control system according to a second embodiment.

FIG. 14 is a view showing a configuration of a head positioning control system according to a second embodiment of the invention.

The head positioning control system of the second embodiment includes a spectrum detection unit 25 which detects a spectrum of the position error signal ES and a selection unit 26 which changes the spectrum detection and the amplitude/phase detection.

Because the center frequency of the disturbance is changed by the vibration state applied to the disk drive and the like, it is difficult to previously estimate a certain value. Therefore, the frequency showing the maximum amplitude is detected from the frequency spectrum of the position error, and the frequency showing the maximum amplitude is set as the center frequency of the phase detection unit in the FF control system 2. As a result, even if the vibration state of the disturbance is changed, the phase of the disturbance is precisely detected, which allows the position error accuracy to be improved.

Figure 15:
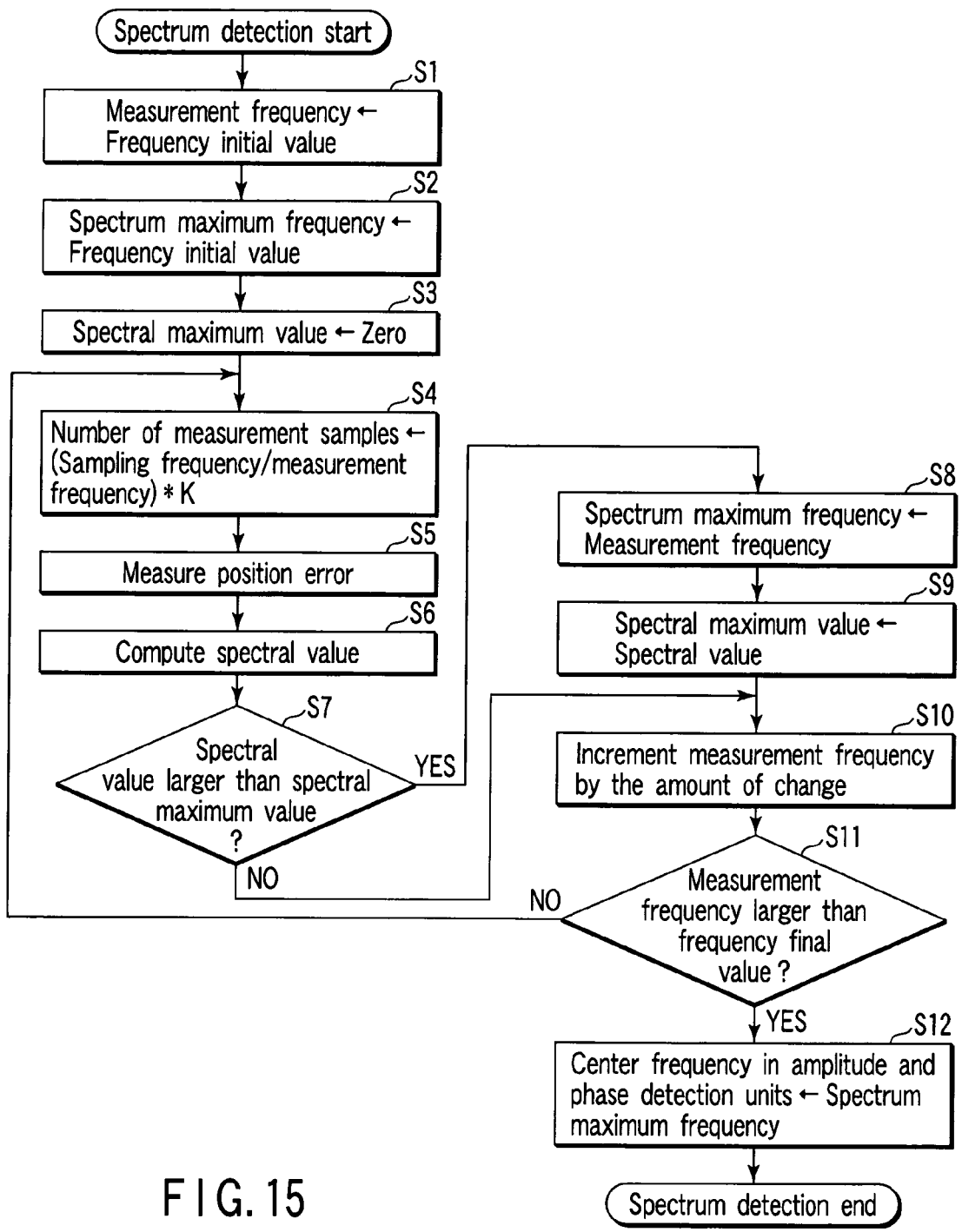
FIG. 15 is a flowchart for explaining the operation of the second embodiment.

The spectrum detection unit 25 executes procedures for a detection process shown by the flowchart of FIG. 15. During the operation of the spectrum detection unit 25, the selection unit 26 sets a switch 24 to cause the position error signal ES from the FB control system 1 to be input to the spectrum detection unit 25. At this point, the selection unit 26 sets a switch 23 to stop the output of the FF signal A4 from the FF control system 2 to the FB control system 1.

The spectrum detection unit 25 previously determines the range and the accuracy of the frequency in which the spectrum detection is performed, and the spectrum detection unit 25 sequentially changes the measurement frequency within the range to compute the spectral value of each frequency (Step S6). The spectrum detection unit 25 determines the frequency in which the spectral value becomes maximum (Step S8).

When the spectrum detection unit 25 starts the spectrum detection, the spectrum detection unit 25 substitutes a frequency initial value for the measurement frequency and the spectral maximum frequency, and the spectrum detection unit 25 also substitutes zero for the spectral maximum value (Steps S1 to S3). Then, the spectrum detection unit 25 determines the number of measurement samples of the position error in each measurement frequency (Step S4). The number of measurement samples is obtained by the following equation (2):

Number of measurement samples=(sampling frequency of position error/measurement frequency)×K  (2), where K is an arbitrary natural number. When K is increased, the sudden change in frequency of the position error hardly affects the number of measurement samples, and the average spectrum of the disturbance can be obtained; however, the measurement time is increased. It is also possible that a fluctuation in measurement time is suppressed by adjusting K so that the number of measurement samples is made constant in each measurement frequency.

The spectrum detection unit 25 measures the position errors of the number of measurement samples to compute the spectral value (Steps S5 and S6). The computation of the spectral value is performed by the following equation (3):

$$s(f) = \left(\frac{1}{N}\sum_{j=1}^{N} p(j)\sin\left(\frac{2\pi f j}{r}\right)\right)^2 + \left(\frac{1}{N}\sum_{j=1}^{N} p(j)\cos\left(\frac{2\pi f j}{r}\right)\right)^2, \quad \text{Equation (3)}$$

where f is the measurement frequency, S(f) is the spectral value of the measurement frequency, N is the number of measurement samples, J is a number labeled to the sample value in order of time, p(j) is the measurement position error, and r is the sampling frequency.

When the spectral value is larger than the spectral maximum value, the spectrum detection unit 25 substitutes the current measurement frequency for the spectrum maximum frequency, and the spectrum detection unit 25 also substitutes the current spectral value for the spectral maximum value (YES in Steps S7, S8 and S9). The spectrum detection unit 25 increments the measurement frequency by the amount of change. When the spectral value is larger than the frequency final value, the spectrum detection unit 25 substitutes the spectrum maximum frequency for center frequencies of the amplitude detection unit and the phase detection unit, and the spectrum detection unit 25 ends the spectrum detection (YES in Steps S11 and S12).

The selection unit 26 enables the spectrum detection unit 25 when power is applied to the disk drive, or when the position error is increased. The selection unit 26 enables the amplitude detection unit and the phase detection unit in the FF control system 2 when the spectrum detection is ended.

When the position error is sufficiently small while the disk drive is not subject to vibration, the selection unit 26 disables the spectrum detection unit 25, the amplitude detection unit and the phase detection unit in the FF control system 2. Therefore, the positioning computation process is reduced in the CPU 37 of the disk drive. Further, in the disk drive, there is also the effect that process efficiency of the processes except for the positioning computation process, such as cache memory operation, can be increased to improve performance.

As described above, according to the above-described embodiments, a disk drive including a head positioning control system which can effectively suppress disturbance by observing the disturbance from head position error information without using an acceleration sensor and the like can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
an actuator to position a head at a target position on a disk medium;
a first controller which controls the actuator by feedback control to position the head at the target position on the disk medium based on position error information between the target position and a position of the head; and
a second controller which outputs a disturbance compensation value to the first controller,
wherein the second controller includes:
an amplitude detection unit which detects an amplitude of narrow-band disturbance from the position error information, using an absolute value computing unit for computing an absolute value of the position error information and a low-pass filter for determining the amplitude from the absolute value;
a phase detection unit which detects a phase of the narrow-band disturbance from the position error information; and
a unit which computes the disturbance compensation value for eliminating the narrow-band disturbance based on each detection result of the amplitude detection unit and the phase detection unit.

2. The disk drive according to claim 1, wherein the second controller includes a unit which computes a product of the amplitude and the phase which are of the detection results of the amplitude detection unit and the phase detection unit to output the computed result as the disturbance compensation value.

3. The disk drive according to claim 1, further comprising a closed-loop transfer function filter unit which inputs the disturbance compensation value output from the second controller.

4. The disk drive according to claim 1, further comprising a closed-loop transfer function filter unit which inputs the disturbance compensation value output from the second controller,
wherein the closed-loop transfer function filter unit performs transfer function filter computation of the feedback control system including the first controller and adds the computed result and the position error information to output the added result to the second controller.

5. The disk drive according to claim 1, wherein a band width of the narrow-band disturbance exists within 30% of a center frequency of the disturbance.

6. The disk drive according to claim 1, wherein the second controller has a unit which computes a frequency spectrum of the position error information and determines a disturbance frequency band showing the maximum value of the amplitude from the position error information based on the frequency spectrum, and the phase detection unit performs a process of detecting the phase of the disturbance based on the disturbance frequency band.

7. A system for positioning a head at a target position on a disk medium in a disk drive, comprising:

an actuator which moves the head to a target position on the disk medium;

a feedback control system which positions the head at the target position on the disk medium by feedback control; and a feedforward control system which outputs a disturbance compensation value for eliminating narrow-band disturbance to the feedback control system based on position error information of the target position computed from the feedback control system and the head, wherein the feedforward control system includes:

an amplitude detection unit which detects an amplitude of the narrow-band disturbance from the position error information, using an absolute value computing unit for computing an absolute value of the position error information and a low-pass filter for determining the amplitude from the absolute value;

a phase detection unit which detects a phase of the narrow-band disturbance; and a unit which computes the disturbance compensation value based on each detection result of the amplitude detection unit and the phase detection unit.

8. The disk drive according to claim 7, wherein the feedforward control system computes a product of the amplitude detected by the amplitude detection unit and the phase detected by the phase detection unit to output the computed result as the disturbance compensation value.

9. The disk drive according to claim 7, further comprising a closed-loop transfer function filter unit which inputs the disturbance compensation value output from the feedforward control system, wherein the closed-loop transfer function filter unit performs transfer function filter computation of the feedback control system and adds the computed result and the position error information to output the added result to the feedforward control system.

10. The disk drive according to claim 7, wherein the feedforward control system (2) has a unit which computes a frequency spectrum of the position error information and determines a disturbance frequency band showing the maximum value of the amplitude from the position error information based on the frequency spectrum, and the phase detection unit performs a process of detecting the phase of the disturbance based on the disturbance frequency band.

11. A method of positioning a head at a target position on a disk medium in a disk drive, the method comprising:

positioning the head at the target position by feedback control based on position error information between the target and a position of the head;

inputting the position error information;

detecting an amplitude of the narrow-band disturbance from the position error information, using an absolute value computing unit for computing an absolute value of the position error information and a low-pass filter for determining the amplitude from the absolute value;

detecting a phase of narrow-band disturbance from the position error information; and computing a disturbance compensation value for eliminating the narrow-band disturbance based on each detection result of the amplitude and the phase.

* * * * *